United States Patent [19]

Martinson et al.

[11] 4,421,190
[45] Dec. 20, 1983

[54] OVERHEAD INSTRUMENT CONSOLE

[75] Inventors: William E. Martinson, Fargo; Michael A. Tuchscherer, West Fargo, both of N. Dak.

[73] Assignee: Steiger Tractor Inc., Fargo, N. Dak.

[21] Appl. No.: 270,111

[22] Filed: Jun. 3, 1981

[51] Int. Cl.³ ............................................. B60K 35/00
[52] U.S. Cl. ..................................... 180/90; 280/752; D12/192
[58] Field of Search ......................... 180/90; 280/752; 350/307; D12/155, 192; 248/27.1

[56] References Cited

U.S. PATENT DOCUMENTS

| | | | |
|---|---|---|---|
| 2,630,187 | 3/1953 | Di Loreto | 180/90 |
| 3,910,371 | 10/1975 | Magrini | 180/90 |
| 3,946,826 | 3/1976 | Guhl et al. | 180/90 |
| 4,114,719 | 9/1978 | Saunders | 180/90 |
| 4,133,405 | 1/1979 | Turek | 180/90 |

Primary Examiner—Richard A. Bertsch
Attorney, Agent, or Firm—Kinney, Lange, Braddock, Westman and Fairbairn

[57] ABSTRACT

An overhead instrument console for use in a tractor includes a panel spanning the driver's compartment. A hinge pivotally connects the panel to the ceiling such that the panel pivots to a down position permitting full access to the rear of instruments mounted on the panel and to such devices as windshield wiper motors, and pivots to an up position hiding from view the rear of the instruments mounted thereon. A latching mechanism is provided to keep the panel in the up position.

5 Claims, 4 Drawing Figures

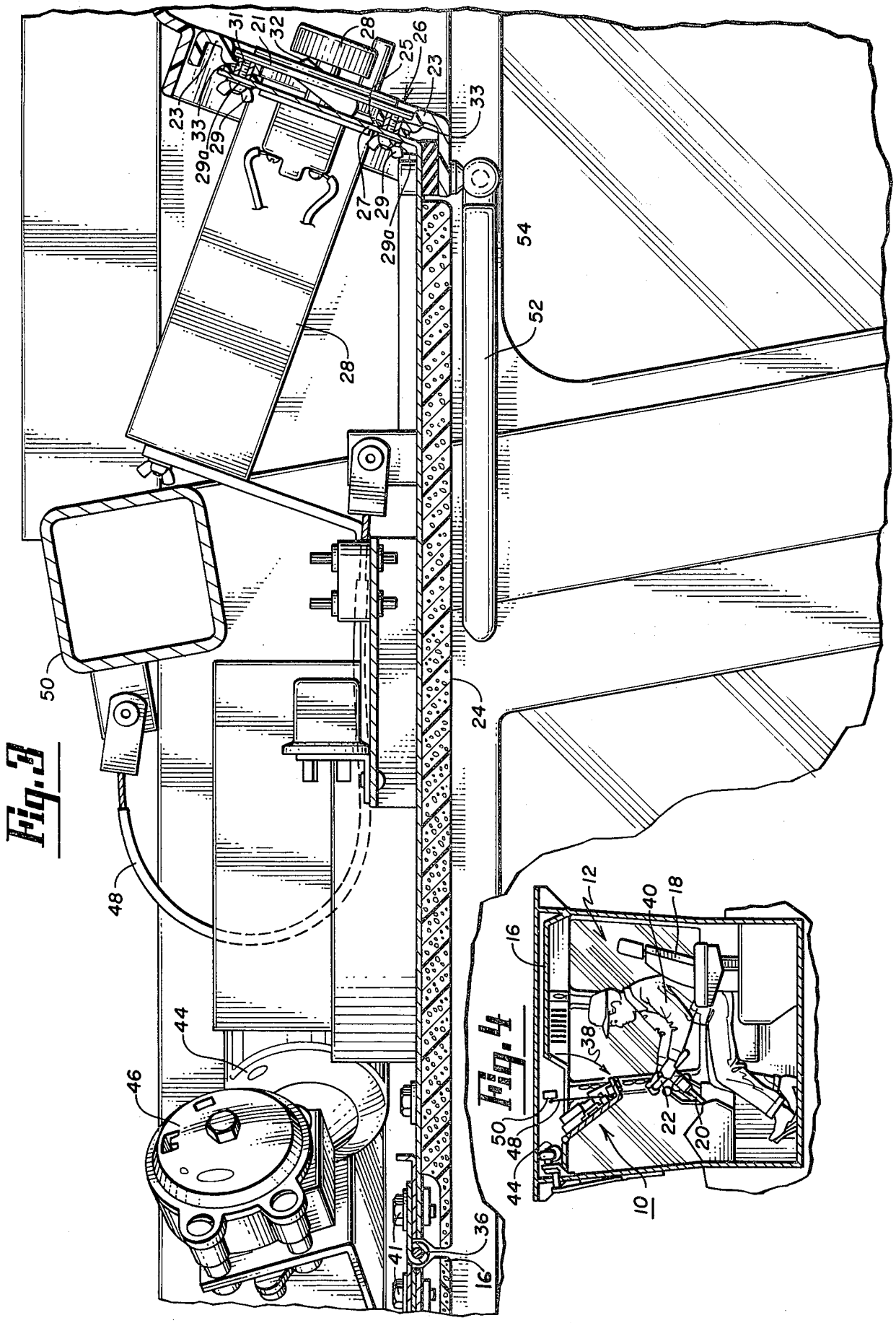

OVERHEAD INSTRUMENT CONSOLE

BACKGROUND OF THE INVENTION

1. Field of the Invention

The present invention relates to instrument consoles in tractors, and in particular, to instrument consoles mounted overhead which are pivoted downwardly permitting full access to the rear of instruments mounted thereon.

2. Description of the Prior Art

Servicing of malfunctioning instruments located in an instrument panel or console of a tractor has long been a problem due to the inaccessibility of the rear part of the instruments. Typically, the front of the console is either removed, or pivoted away in an upward or downward direction. However, the steering wheel of the tractor generally permits limited pivoting or only partial removal of the console.

There are several patents in the prior art which try to increase accessibility to instruments mounted on consoles in motor vehicles. The Di Loreto U.S. Pat. No. 2,630,187 shows an instrument panel mounted to a drawer positioned on the dashboard which pulls out and tips down. The instrument panel is normally held closed by sheet metal screws. The steering wheel column found in today's vehicles would interfere with the Di Loreto drawer-type arrangement in allowing full exposure of the rear part of the instruments and wiring.

The Magrini U.S. Pat. No. 3,910,371 shows an instrument panel on a dashboard which tips upwardly to expose the wiring. However, this arrangement only provides limited access to the rear part of the instruments and wiring.

The Guhl et al U.S. Pat. No. 3,946,826 has an instrument panel which tips upwardly, there being a swinging lever with notches to hold the instrument panel in either of two upwardly tilted positions. Although the upwardly pivoting panel can be pivoted without interference from the steering wheel and column, providing more access to the instruments, full access is still not achieved. Dash mounting of instruments prohibits full access to the rear of the instruments due to interference from the steering column. In an upwardly pivoted panel, the rear part of the instruments are facing downwardly which causes difficulty in providing maintenance.

The Saunders U.S. Pat. No. 4,114,719 shows an instrument panel which tips downwardly. In trying to obtain full access to the backside of the instruments, the Saunders patent shows an instrument panel tipping downwardly along with tipping the steering column toward the floor board. The arrangement of the Saunders patent in furnishing access to the rear part of the instruments adds extra expense in including a pivotal steering wheel column.

The Turek U.S. Pat. No. 4,133,405 shows an overhead console transversely located in an automobile above the forward windshield. A central cut-out allows a second instrument panel to be positioned longitudinally along the ceiling of the driver's compartment. The instrument console must be completely detached from the ceiling in providing maintenance to the rear part of the instruments.

SUMMARY OF THE INVENTION

The present invention provides an overhead instrument console for use in a tractor having a driver's compartment with a steering wheel and steering column. The console includes a panel spanning the driver's compartment. A hinge pivotally connects the panel to the ceiling allowing the panel to pivot to a down position permitting full access to the rear of instruments mounted on the panel, and pivoting to an up position hiding from view the rear part of the instruments mounted on the panel. A latching mechanism is included to hold the panel in the up position.

The overhead console avoids interference from the steering column and steering wheel in providing maintenance to the rear part of the instruments. The overhead console is particularly desirable in tractors which have a large amount of instrumentation. In addition, with the console in the down position, additional access to other instruments or electrical components, such as windshield wiper motors, is available.

BRIEF DESCRIPTION OF THE DRAWINGS

FIG. 3 is a cross-sectional side view revealing preferred components of the instrument console with sun visor in a raised position along the line 3—3 of FIG. 1; and FIG. 4 is a side elevational view of a driver's compartment of a tractor with the instrument panel in the down position.

DETAILED DESCRIPTION OF THE PREFERRED EMBODIMENTS

Figure 1:
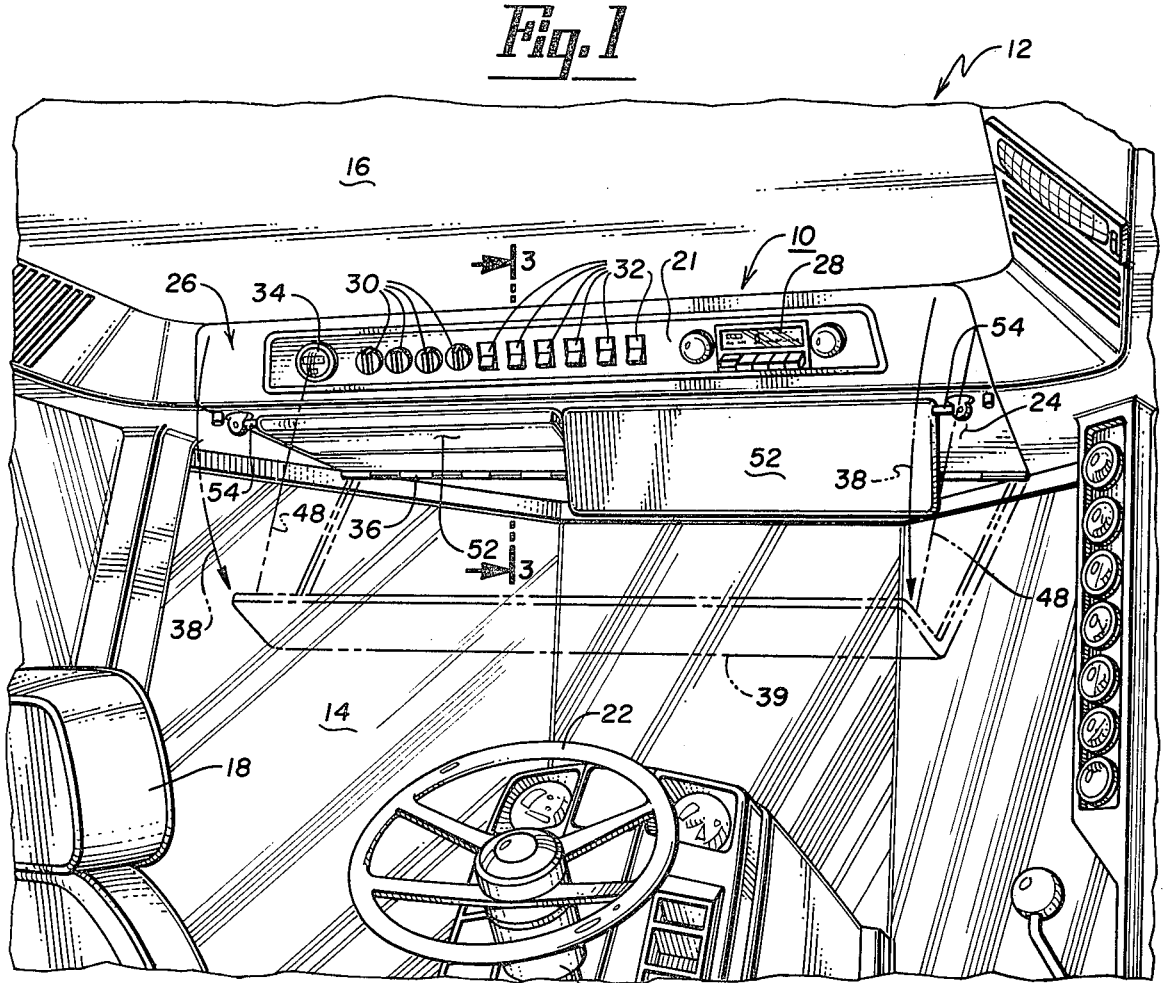
FIG. 1 is a perspective view of the instrument console of the present invention positioned in a preferred location in a driver's compartment of a tractor.

An overhead instrument console is generally illustrated at 10 in FIG. 1 positioned preferably at the front end of a driver's compartment 12 of a tractor, proximate a windshield 14. The driver's compartment 12 has a ceiling 16, driver's seat 18, steering column 20 with steering wheel 22. The overhead instrument console 10 is preferably made part of the ceiling structure 16 when in an up position, as shown in FIG. 1.

Figure 2:
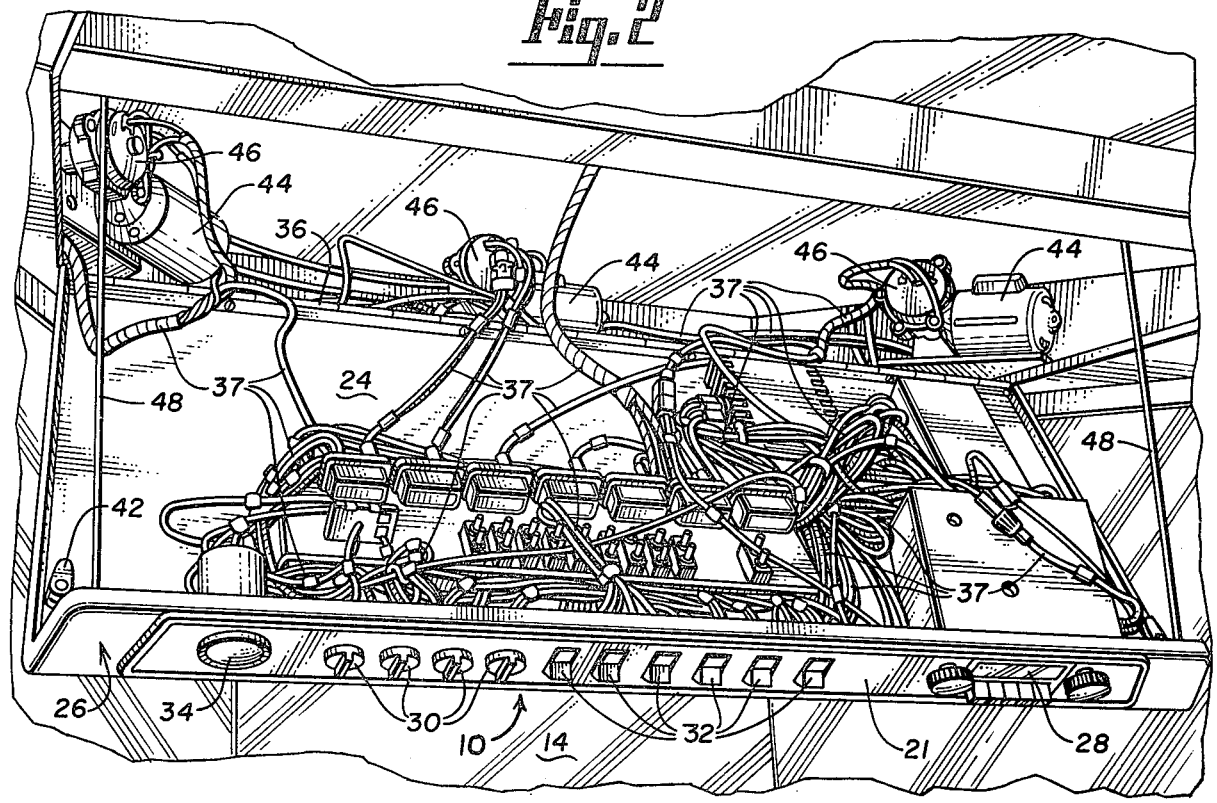
FIG. 2 is a perspective view of the instrument console in a down position showing full access to the rear part of the instruments mounted thereon with additional access to windshield wiper motors.

Overhead instrument console 10 preferably has a substantially horizontal bottom panel 24 and substantially vertical front panel 26, as shown in FIG. 2. The bottom panel 24 is sufficiently long to provide enough longitudinal depth to the console 10 for mounting most conventional instruments used in the tractor. The front panel 26 is a mounting panel from which the exterior portions of the instruments extend, and can be easily seen and reached from the driver's seat 18. Examples of instruments that can be mounted on the overhead instrument console 10 of the present invention are shown in FIGS. 1 and 2 and include a radio 28, rotary switches 30, rocker switches 32 and gauge 34. The above list of instruments is not inclusive, and any type of instrument normally found within the driver's compartment of the motor vehicle is includable.

The front panel 26, as shown in FIG. 3, is a composite panel having a front face plate 21, a front mounting panel 23, a gasket 25, and a back panel 27. Wing nuts 29 engage threaded studs 31 which are attached to front face plate 21 and along with tooth washers 29a hold the various components of panel 26 together as a unit. Spacer sleeves 33 separate front face plate 21 and front mounting panel 23 from back panel 27. Preferably, the instruments are mounted to the back panel 27.

A hinge 36 pivotally connects the instrument console 10 to the ceiling 16 as shown in FIGS. 1 and 2. The hinge 36 preferably extends across the entire width of the instrument console 10. However, several hinges pivotally connecting the instrument console 10 to the ceiling 16 are within the scope of the present invention. The hinge 36 is fastened to both the ceiling 16 and the instrument console 10 by screws 41, as shown in FIG. 3. The hinge 36 permits pivoting of the overhead instrument console from an up position to a down position, as indicated by arrows 38 and broken lines 39 in FIG. 1 and as best seen in the down position in FIG. 2.

In the up position the overhead instrument console 10 is preferably part of the ceiling structure 16 in the driver's compartment 12. In the down position, overhead instrument console 10 provides complete access to all the instruments and wiring 37 mounted on the console 10, as shown in both FIGS. 2 and 4. The instrument console 10, being pivotally attached to ceiling 16, is pivoted to the down position without any interference from the steering column 20 or the steering wheel 22. In addition, an operator 40 sitting in driver's seat 18 may easily perform any type of maintenance required since the rear part of the instruments are located on the upper surface of the console 10 and the upper surface facing the driver 40 when the console is in the down position. A conventional latching mechanism 42 is preferably mounted on the bottom panel 24 of the instrument console 10 for securing the instrument console 10 in the up position to the ceiling 16. Latching mechanism 42 may be of any conventional type and may have any suitable means (not shown) accessible from the bottom of panel 24, such as a knob or screw head, to actuate the latching mechanism.

In addition to providing access to the backside of instruments mounted on the console, the console 10 when in the down position also provides access to other instruments and electrical components located within the ceiling 16. In addition, access to the electrical wiring 37 and other electrical circuitry is made available when the console 10 is in the down position. Preferably, such components include windshield wiper motors 46 which power windshield wiper arm drive mechanism 44 that wipe the exterior of the windshield 14 as shown in FIGS. 1 and 2 by activating windshield wiper blades (not shown). Typically, access to the windshield wiper motor 44 is not readily available and involves a great deal of work in providing maintenance to such motors. Access to such hidden electrical components, such as windshield wiper motors, is now readily available when the console 10 of the present invention is in the down position, as most clearly indicated in FIGS. 2 and 4.

A pair of cables 48 preferably limit the downward pivot of the instrument console 10. The cables 48 are attached to the instrument console 10 in any conventional manner at one end, and are attached to a fixed structural component 50 of the driver's compartment 12 at the other end, in any conventional manner. The cables 48, in addition to limiting the downward pivot of the instrument console 10, also hold the instrument console 10 in a stable position for maintenance work.

Sun visors 52 preferably are pivotally mounted to the back panel 27 of the instrument console 10. The sun visors 52 frictionally pivot on visor rods 54 which are in turn fixedly attached to the instrument console 10.

CONCLUSION

The present invention provides an instrument console which when pivoted downwardly exposes the rear part of instruments mounted thereon and all their wiring, providing ready access for maintenance purposes. The downward pivot of the console is free from any obstruction, such as a steering wheel and steering column, and displays the rear part of the instruments and their wiring on the side of the console that faces the operator.

Although the present invention has been described with reference to the preferred embodiments, workers skilled in the art will recognize that changes may be made in form and detail without departing from the spirit and scope of the invention.

What is claimed is:

1. An overhead instrument console in combination with a tractor having a driver's compartment with a steering column and steering wheel, and having windows with motor driven windshield wipers, and a ceiling structure, the console comprising:

a panel having vertical and horizontal panel sections and transversely substantially spanning the driver's compartment overhead adjacent to the windows and having a plurality of instruments mounted on the vertical panel portion and extending through to the rear of said panel, secured to the ceiling structure when in the up position, said panel when in the down position providing access to electrical components and the electrical circuitry located within the ceiling structure and connecting the electrical components located within the ceiling structure;

a hinge pivotally connecting said horizontal panel section to the ceiling structure so that said horizontal panel section constitutes part of the ceiling structure and such that the panel can be pivotally lowered to a down position without interference from the steering wheel, thus permitting full access to the rear of the instruments mounted on the panel and can be pivotally moved to an up position hiding from view the rear of the instruments mounted thereon; and means for limiting the downward pivoting of the panel and holding the panel in a downwardly angular plane in a stable position.

2. The console of claim 1 wherein the wiper motors of the motor driven windshield wipers are accessible when the panel is lowered.

3. The console of claim 1 in which there are sun visors pivotally mounted to the panel.

4. The console of claim 1 wherein the hinge pivotally connects the panel to the ceiling across the entire transverse width of the panel.

5. The console of claim 1 in which the means for limiting downward pivoting of the panel is a cable means secured at one end to the ceiling structure and at its other end to the panel.

* * * * *